United States Patent
Anzagira et al.

(10) Patent No.: US 12,235,955 B2
(45) Date of Patent: Feb. 25, 2025

(54) METHOD AND SYSTEM FOR DETECTING MODEL MANIPULATION THROUGH EXPLANATION POISONING

(71) Applicant: JPMorgan Chase Bank, N.A., New York, NY (US)

(72) Inventors: Allan Anzagira, Long Island City, NY (US); Freddy Lecue, Mamaroneck, NY (US); Daniele Magazzeni, London (GB); Saumitra Mishra, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 279 days.

(21) Appl. No.: 18/096,873

(22) Filed: Jan. 13, 2023

(65) Prior Publication Data
US 2024/0241952 A1    Jul. 18, 2024

(51) Int. Cl.
*G06F 21/56* (2013.01)
(52) U.S. Cl.
CPC .................................... *G06F 21/56* (2013.01)
(58) Field of Classification Search
None
See application file for complete search history.

(56) References Cited

U.S. PATENT DOCUMENTS

| | | | |
|---|---|---|---|
| 2020/0387833 A1* | 12/2020 | Kursun | G06N 20/20 |
| 2022/0012591 A1* | 1/2022 | Dalli | G06N 3/082 |
| 2022/0207326 A1* | 6/2022 | Zaker Habibabadi | G06N 3/045 |
| 2022/0253426 A1* | 8/2022 | Zhu | G06N 3/044 |
| 2023/0185912 A1* | 6/2023 | Sinn | G06F 21/56 726/23 |
| 2023/0208858 A1* | 6/2023 | Mishra | H04L 63/1416 726/23 |
| 2023/0325678 A1* | 10/2023 | Fradkin | G06N 20/20 706/25 |
| 2024/0202405 A1* | 6/2024 | Lang | G06F 30/27 |

* cited by examiner

*Primary Examiner* — Christopher C Harris

(74) *Attorney, Agent, or Firm* — GREENBLUM & BERNSTEIN, P.L.C.

(57) ABSTRACT

Methods and systems for detecting attempted manipulation of a machine learning model via explanation poisoning are provided. The method includes: computing explanations based on outputs of the model that include information that relates to features that affect the output of the model with respect to the first data point; assigning labels to the explanations based on the features; generating an explanation ensemble that resides in an N-dimensional space, N being equal to a number of assigned labels plus one; determining a region within the N-dimensional space for which a subsequent introduction of data causes a subsequent explanation that does not relate to the features; and when the additional data is introduced to the determined region, generating an alert message for notifying a user that a likelihood of adverse manipulation of the model is high based on the additional data.

20 Claims, 4 Drawing Sheets

METHOD AND SYSTEM FOR DETECTING MODEL MANIPULATION THROUGH EXPLANATION POISONING

BACKGROUND

1. Field of the Disclosure

This technology generally relates to methods and systems for constructing and maintaining machine learning models, and more particularly to methods and systems for detecting attempted manipulation of a machine learning model through explanation poisoning in order to maintain quality and accuracy of model outputs.

2. Background Information

Machine learning models are used for performing many tasks for which artificial intelligence (AI) techniques are applicable for obtaining results. Conventionally, historical data relating to a particular task is used for training such a model, and the model may be regularly maintained by providing fresh historical data.

Machine learning models are becoming increasingly integrated in regulated environments, such as, for example, banks and financial institutions, for performing various functions such as making credit decisions and executing automated trades and transactions. The control of such models is typically established through explanation, in order to ensure that a particular model performs as expected and without surprise. However, models evolve over time as data changes, and as fresh historical data is provided. As a result, underlying explanations also change, as an adaptation to the changes in the data.

One problem that may occur relates to a possibility that an attacker might wish to poison an explanation by supplying corrupted or misleading data as an input to a particular model. In this aspect, such an attacker may be motivated by a desire to undermine confidence in the trustworthiness of the model, for example, with respect to enforcement of regulations by an outside regulator, and/or by a desire to simply bias and corrupt the model.

Regulators of bank modelers rely on explanations in order to ensure that risk is managed for credit and investments. It is important that explanations are reliable and robust with respect to changing data. Accordingly, there is a need for a method for detecting attempted manipulation of a machine learning model through explanation poisoning in order to maintain quality and accuracy of model outputs.

SUMMARY

The present disclosure, through one or more of its various aspects, embodiments, and/or specific features or sub-components, provides, inter alia, various systems, servers, devices, methods, media, programs, and platforms for methods and systems for detecting attempted manipulation of a machine learning model through explanation poisoning in order to maintain quality and accuracy of model outputs.

According to an aspect of the present disclosure, a method for detecting attempted manipulation of a machine learning model via explanation poisoning is provided. The method is implemented by at least one processor. The method includes: receiving, by the at least one processor, a set of raw data that is usable for training a first model; training, by the at least one processor, the first model by using the set of raw data; selecting, by the at least one processor, a set of target data based on the set of raw data; computing, by the at least one processor, a first explanation based on an output of the first model with respect to a first data point included in the set of target data, the first explanation including first information that relates to at least one first feature that affects the output of the first model with respect to the first data point; computing, by the at least one processor, a second explanation based on an output of the first model with respect to a second data point included in the set of target data, the second explanation including second information that relates to at least one second feature that affects the output of the first model with respect to the second data point; assigning, by the at least one processor based on the at least one first feature, a first label to the first explanation, and assigning, by the at least one processor based on the at least one second feature, a second label to the second explanation; generating, by the at least one processor based on the first label and the second label, an explanation ensemble that resides in an N-dimensional space, N being equal to a number of assigned labels plus one; transforming, by the at least one processor, the set of raw data into data that resides in the N-dimensional space; determining, by the at least one processor based on the transformed set of raw data, a region within the N-dimensional space for which a subsequent introduction of additional data from the target set of data causes a subsequent explanation that does not relate to at least one from among the at least one first feature and the at least one second feature; and when the additional data is introduced to the determined region, generating, by the at least one processor, an alert message that includes information for notifying a user that a likelihood of adverse manipulation of the first model is high based on the additional data.

The first model may include at least one from among a tree-based model, a neural network model, and a linear model.

The at least one first feature may include a plurality of first features that relate to the first model. The first information may further include a corresponding ranking value for each respective feature from among the plurality of first features.

The computing of the first explanation may include applying a Shapley Additive explanations (SHAP) technique to each feature from among the plurality of first features.

The at least one second feature may include a plurality of second features that relate to the first model. The second information may further include a corresponding ranking value for each respective feature from among the plurality of second features.

The computing of the second explanation may include applying a Shapley Additive explanations (SHAP) technique to each feature from among the plurality of second features.

The method may further include: computing, by the at least one processor, at least a third explanation based on an output of the first model with respect to at least a third data point included in the set of target data, the at least third explanation including third information that relates to at least one third feature that affects the output of the first model with respect to the at least third data point; and assigning, by the at least one processor based on the at least one third feature, at least a third label to the at least third explanation. The generating of the explanation ensemble may be further based on the at least third label. The determining of the region may further include determining the region for which the subsequent introduction of the additional data causes a subsequent explanation that does not relate to at least one from among the at least one first feature, the at least one second feature, and the at least one third feature.

The set of raw data may include bond pricing data that relates to a first bond. The first model may be configured to generate a projected price of the first bond at a particular time.

Alternatively, the set of raw data may include credit scoring data that relates to a credit request associated with an individual credit applicant, and the first model may be configured to determine whether to approve the credit request.

According to another exemplary embodiment, a computing apparatus for detecting attempted manipulation of a machine learning model via explanation poisoning is provided. The computing apparatus includes a processor; a memory; and a communication interface coupled to each of the processor and the memory. The processor is configured to: receive, via the communication interface, a set of raw data that is usable for training a first model; train the first model by using the set of raw data; select a set of target data based on the set of raw data; compute a first explanation based on an output of the first model with respect to a first data point included in the set of target data, the first explanation including first information that relates to at least one first feature that affects the output of the first model with respect to the first data point; compute a second explanation based on an output of the first model with respect to a second data point included in the set of target data, the second explanation including second information that relates to at least one second feature that affects the output of the first model with respect to the second data point; assign, based on the at least one first feature, a first label to the first explanation, and assign, based on the at least one second feature, a second label to the second explanation; generate, based on the first label and the second label, an explanation ensemble that resides in an N-dimensional space, N being equal to a number of assigned labels plus one; transform the set of raw data into data that resides in the N-dimensional space; determine, based on the transformed set of raw data, a region within the N-dimensional space for which a subsequent introduction of additional data from the target set of data causes a subsequent explanation that does not relate to at least one from among the at least one first feature and the at least one second feature; and when the additional data is introduced to the determined region, generate an alert message that includes information for notifying a user that a likelihood of adverse manipulation of the first model is high based on the additional data.

The first model may include at least one from among a tree-based model, a neural network model, and a linear model.

The at least one first feature may include a plurality of first features that relate to the first model. The first information may further include a corresponding ranking value for each respective feature from among the plurality of first features.

The processor may be configured to compute the first explanation by applying a Shapley Additive explanations (SHAP) technique to each feature from among the plurality of first features.

The at least one second feature may include a plurality of second features that relate to the first model. The second information may further include a corresponding ranking value for each respective feature from among the plurality of second features.

The processor may be configured to compute the second explanation by applying a Shapley Additive explanations (SHAP) technique to each feature from among the plurality of second features.

The processor may be further configured to: compute at least a third explanation based on an output of the first model with respect to at least a third data point included in the set of target data, the at least third explanation including third information that relates to at least one third feature that affects the output of the first model with respect to the at least third data point; and assign, based on the at least one third feature, at least a third label to the at least third explanation. The explanation ensemble may be further based on the at least third label. The processor may be further configured to determine the region by determining the region for which the subsequent introduction of the additional data causes a subsequent explanation that does not relate to at least one from among the at least one first feature, the at least one second feature, and the at least one third feature.

The set of raw data may include bond pricing data that relates to a first bond. The first model may be configured to generate a projected price of the first bond at a particular time.

Alternatively, the set of raw data may include credit scoring data that relates to a credit request associated with an individual credit applicant, and the first model may be configured to determine whether to approve the credit request.

According to yet another exemplary embodiment, a non-transitory computer readable storage medium storing instructions for detecting attempted manipulation of a machine learning model via explanation poisoning is provided. The storage medium includes executable code which, when executed by a processor, causes the processor to: receive a set of raw data that is usable for training a first model; train the first model by using the set of raw data; select a set of target data based on the set of raw data; compute a first explanation based on an output of the first model with respect to a first data point included in the set of target data, the first explanation including first information that relates to at least one first feature that affects the output of the first model with respect to the first data point; compute a second explanation based on an output of the first model with respect to a second data point included in the set of target data, the second explanation including second information that relates to at least one second feature that affects the output of the first model with respect to the second data point; assign, based on the at least one first feature, a first label to the first explanation, and assign, based on the at least one second feature, a second label to the second explanation; generate, based on the first label and the second label, an explanation ensemble that resides in an N-dimensional space, N being equal to a number of assigned labels plus one; transform the set of raw data into data that resides in the N-dimensional space; determine, based on the transformed set of raw data, a region within the N-dimensional space for which a subsequent introduction of additional data from the target set of data causes a subsequent explanation that does not relate to at least one from among the at least one first feature and the at least one second feature; and when the additional data is introduced to the determined region, generate an alert message that includes information for notifying a user that a likelihood of adverse manipulation of the first model is high based on the additional data.

The first model may include at least one from among a tree-based model, a neural network model, and a linear model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
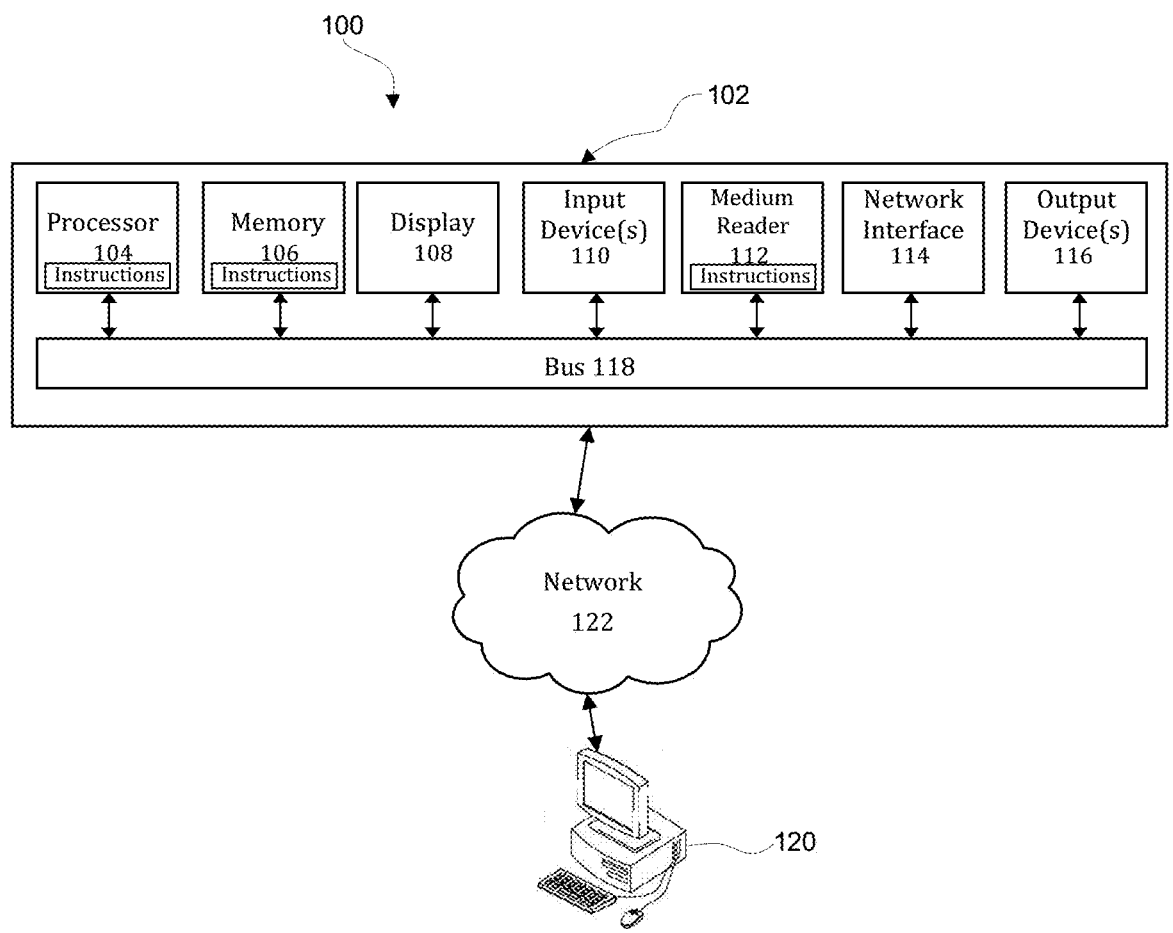
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for detecting attempted manipulation of a machine learning model through explanation poisoning in order to maintain quality and accuracy of model outputs.

Figure 2:
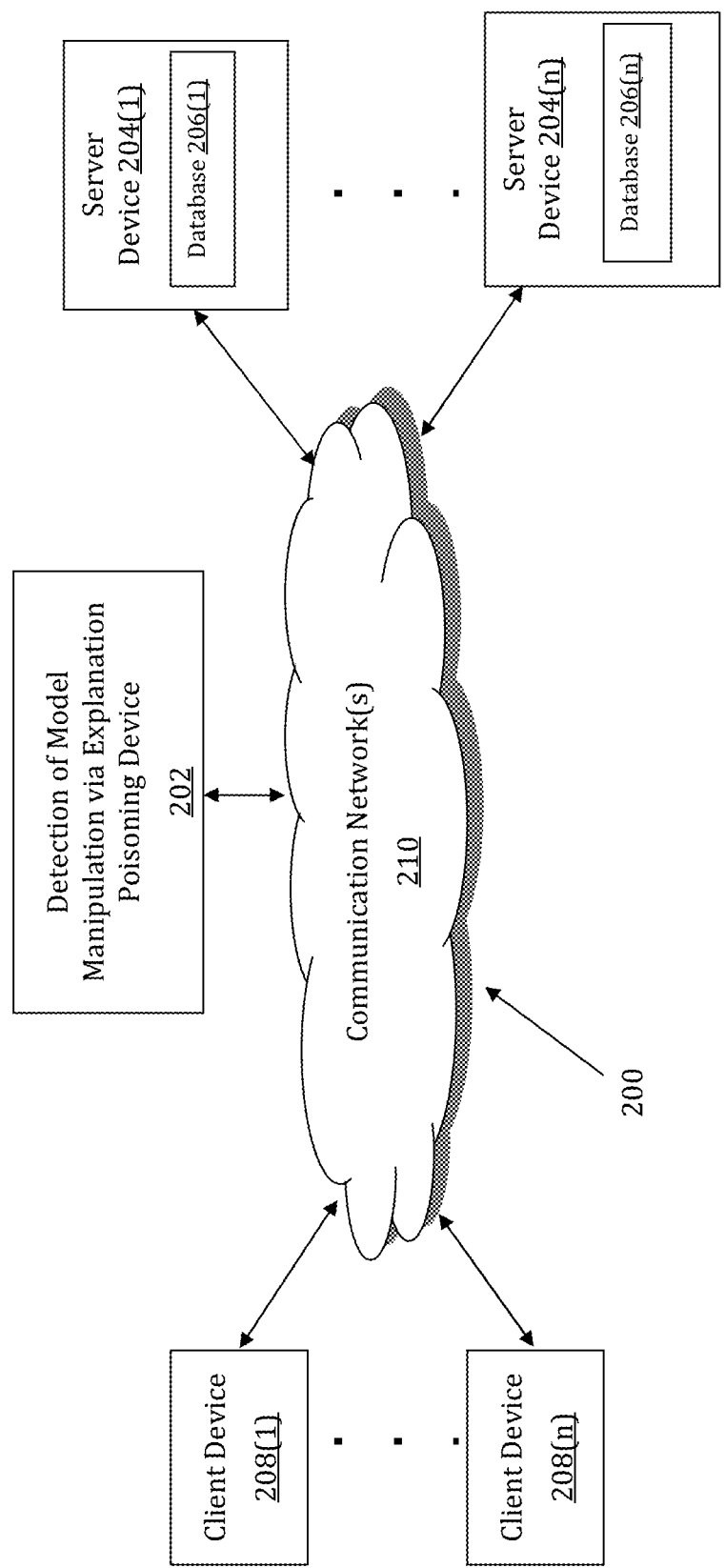
FIG. 2 illustrates an exemplary diagram of a network environment.

Referring to FIG. 2, a schematic of an exemplary network environment 200 for implementing a method for detecting attempted manipulation of a machine learning model through explanation poisoning in order to maintain quality and accuracy of model outputs is illustrated. In an exemplary embodiment, the method is executable on any networked computer platform, such as, for example, a personal computer (PC).

The method for detecting attempted manipulation of a machine learning model through explanation poisoning in order to maintain quality and accuracy of model outputs may be implemented by a Detection of Model Manipulation via Explanation Poisoning (DMMEP) device 202. The DMMEP device 202 may be the same or similar to the computer system 102 as described with respect to FIG. 1. The DMMEP device 202 may store one or more applications that can include executable instructions that, when executed by the DMMEP device 202, cause the DMMEP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DMMEP device 202 itself, may be located in virtual server(s) running in a cloud-based computing environment rather than being tied to one or more specific physical network computing devices. Also, the application(s) may be running in one or more virtual machines (VMs) executing on the DMMEP device 202. Additionally, in one or more embodiments of this technology, virtual machine(s) running on the DMMEP device 202 may be managed or supervised by a hypervisor.

In the network environment 200 of FIG. 2, the DMMEP device 202 is coupled to a plurality of server devices 204(1)-204(n) that hosts a plurality of databases 206(1)-206(n), and also to a plurality of client devices 208(1)-208(n) via communication network(s) 210. A communication interface of the DMMEP device 202, such as the network interface 114 of the computer system 102 of FIG. 1, operatively couples and communicates between the DMMEP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DMMEP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DMMEP devices that efficiently implement a method for detecting attempted manipulation of a machine learning model through explanation poisoning in order to maintain quality and accuracy of model outputs.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DMMEP device 202 may be a standalone device or integrated with one or more other devices or apparatuses, such as one or more of the server devices 204(1)-204(n), for example. In one particular example, the DMMEP device 202 may include or be hosted by one of the server devices 204(1)-204(n), and other arrangements are also possible. Moreover, one or more of the devices of the DMMEP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DMMEP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store information that relates to historical model outputs and information that relates to metrics for model-specific logic and explanations.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DMMEP device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DMMEP device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DMMEP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DMMEP device 202, the server devices 204(1)-204(n), or the client devices 208(1)-

208(n), for example, may be configured to operate as virtual instances on the same physical machine. In other words, one or more of the DMMEP device 202, the server devices 204(1)-204(n), or the client devices 208(1)-208(n) may operate on the same physical device rather than as separate devices communicating through communication network(s) 210. Additionally, there may be more or fewer DMMEP devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
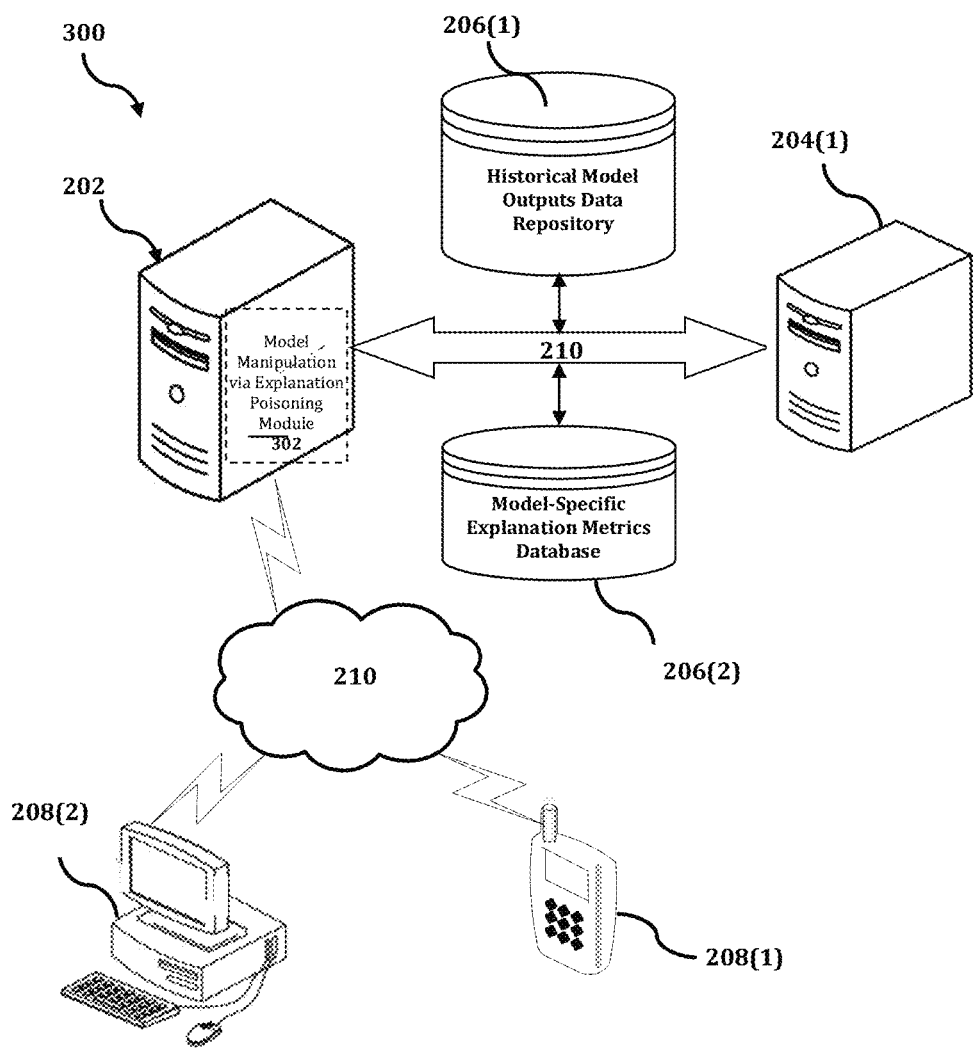
FIG. 3 shows an exemplary system for implementing a method for detecting attempted manipulation of a machine learning model through explanation poisoning in order to maintain quality and accuracy of model outputs.

The DMMEP device 202 is described and illustrated in FIG. 3 as including a model manipulation via explanation poisoning module 302, although it may include other rules, policies, modules, databases, or applications, for example. As will be described below, the model manipulation via explanation poisoning module 302 is configured to implement a method for detecting attempted manipulation of a machine learning model through explanation poisoning in order to maintain quality and accuracy of model outputs.

An exemplary process 300 for implementing a mechanism for detecting attempted manipulation of a machine learning model through explanation poisoning in order to maintain quality and accuracy of model outputs by utilizing the network environment of FIG. 2 is illustrated as being executed in FIG. 3. Specifically, a first client device 208(1) and a second client device 208(2) are illustrated as being in communication with DMMEP device 202. In this regard, the first client device 208(1) and the second client device 208(2) may be "clients" of the DMMEP device 202 and are described herein as such. Nevertheless, it is to be known and understood that the first client device 208(1) and/or the second client device 208(2) need not necessarily be "clients" of the DMMEP device 202, or any entity described in association therewith herein. Any additional or alternative relationship may exist between either or both of the first client device 208(1) and the second client device 208(2) and the DMMEP device 202, or no relationship may exist.

Further, DMMEP device 202 is illustrated as being able to access a historical model outputs data repository 206(1) and a model-specific explanation metrics database 206(2). The model manipulation via explanation poisoning module 302 may be configured to access these databases for implementing a method for detecting attempted manipulation of a machine learning model through explanation poisoning in order to maintain quality and accuracy of model outputs.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DMMEP device 202 via broadband or cellular communication. Of course, these embodiments are merely exemplary and are not limiting or exhaustive.

Upon being started, the model manipulation via explanation poisoning module 302 executes a process for detecting attempted manipulation of a machine learning model through explanation poisoning in order to maintain quality and accuracy of model outputs. An exemplary process for detecting attempted manipulation of a machine learning model through explanation poisoning in order to maintain quality and accuracy of model outputs is generally indicated at flowchart 400 in FIG. 4.

Figure 4:
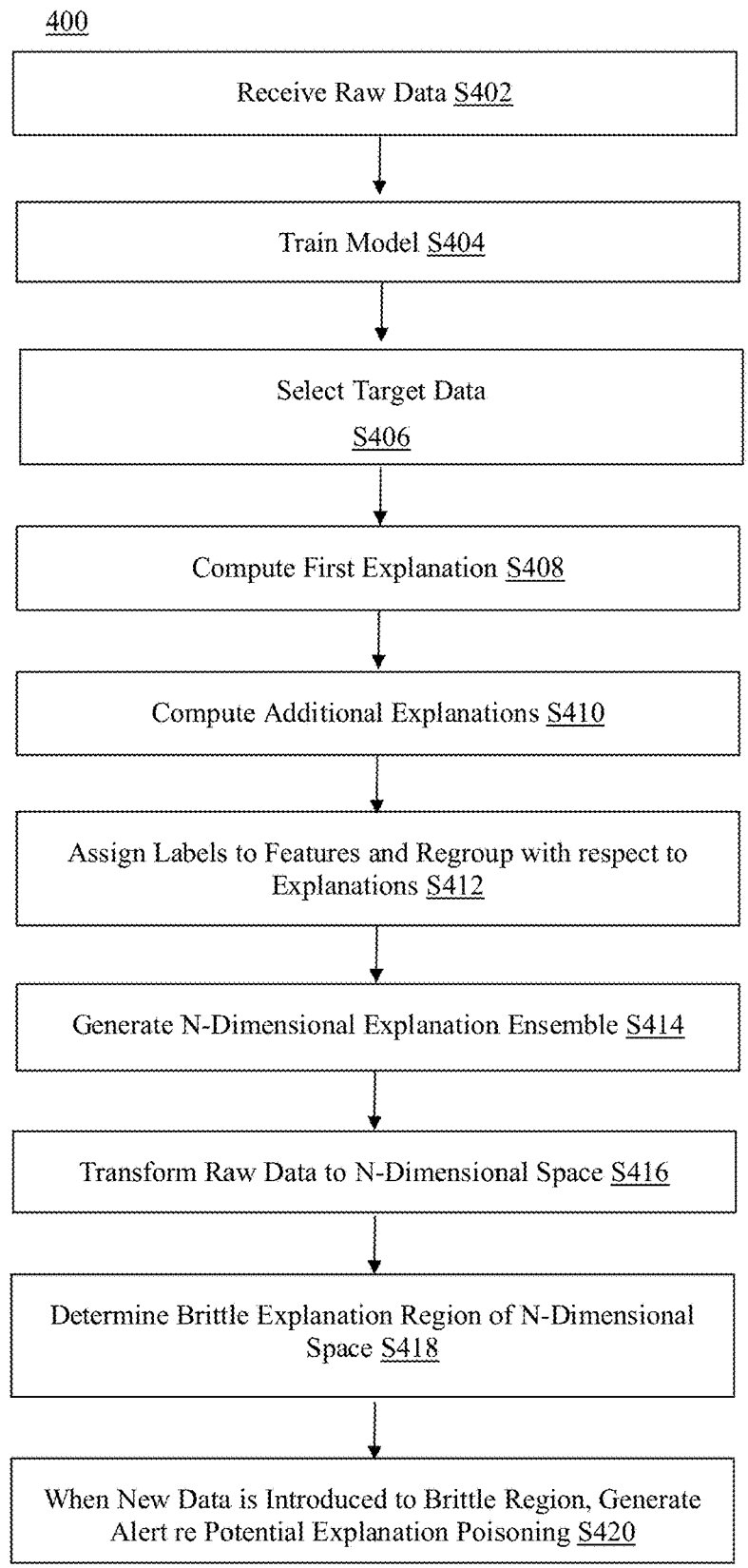
FIG. 4 is a flowchart of an exemplary process for implementing a method for detecting attempted manipulation of a machine learning model through explanation poisoning in order to maintain quality and accuracy of model outputs.

In process 400 of FIG. 4, at step S402, the model manipulation via explanation poisoning module 302 receives at least one set of raw data that relates to a quantity that varies with respect to time and is related to a machine learning model that is configured to project future values of the quantity. In an exemplary embodiment, the model may be configured to project bond pricing values for a particular type of financial bond, and the raw data may include a set of bond pricing values that occurred during a particular time interval. For example, a first set of raw data may include bond pricing data from January 2020 that is deemed as being "pre-COVID-19 pandemic" bond pricing data, and a second set of raw data may include bond pricing data from Autumn 2022 that is deemed as coinciding with a "USA Bear Market." In another exemplary embodiment, the model may be configured to determine whether or not to approve a credit request that has been submitted by an individual credit applicant, and the raw data may include credit scoring data that relates to the credit request and/or the individual credit applicant.

At step S404, the model manipulation via explanation poisoning module 302 trains the machine learning model by using the raw data received in step S402. In an exemplary embodiment, the model may include any one or more of a tree-based model, a neural network model, and/or a linear model. In an exemplary embodiment, the model may be trained separately for each set of raw data that is provided as an input in step S402.

At step S406, the model manipulation via explanation poisoning module 302 selects a set of target data based on the raw data received in step S402. In an exemplary embodiment, the selection of the target data set may be performed by random selection of a predetermined number of data points. Then, at step S408, the model manipulation via explanation poisoning module 302 computes a first explanation with respect to the machine learning model, based on a first data point included in the set of target data. In an exemplary embodiment, the first explanation includes information that relates to a set of first features that are characteristic of the model and that affect the computation of the first explanation, as well as a corresponding ranking value for each such feature. In an exemplary embodiment, the computation of the first explanation may be performed by applying any technique that belongs to a set of feature attribution/importance methods, such as, for example, a SHapley Additive explanations (SHAP) technique, to each feature included in the set of first features.

At step S410, the model manipulation via explanation poisoning module 302 computes additional explanations, i.e., at least a second explanation with respect to the machine learning model, based on a second data point included in the set of target data. In an exemplary embodiment, the second explanation includes information that relates to a set of second features that are also characteristic of the model and that affect the computation of the second explanation, as well as a corresponding ranking value for each such feature. In an exemplary embodiment, the computation of the second explanation may also be performed by applying any technique that belongs to a set of feature attribution/importance methods, such as, for example, the SHAP technique, to each feature included in the set of second features.

In an exemplary embodiment, the model manipulation via explanation poisoning module 302 may compute a third explanation with respect to the machine learning model based on a third data point included in the set of target data, in a similar manner as discussed above with respect to the first and second explanations. Further, additional explanations may be computed based on additional data points from the set of target data.

At step S412, the model manipulation via explanation poisoning module 302 assigns labels to each feature identified with reference to the explanations computed in steps S408 and S410, and then regroups the labels with respect to the explanations. Then, at step S414, the model manipulation via explanation poisoning module 302 generates an explanation ensemble that resides in an N-dimensional space, where N is equal to the number of labels assigned in step S412 plus one (i.e., N=# of labels+1). In an exemplary embodiment, the explanation ensemble may be expressed as a vector for which each label is associated with a coordinate having a value that corresponds to the ranking value of the respective feature for the corresponding explanation.

At step S416, the model manipulation via explanation poisoning module 302 transforms the raw data received in step S402 into the N-dimensional space. Then, at step S418, the model manipulation via explanation poisoning module 302 determines a region within the N-dimensional space for which a subsequent introduction of additional data from the set of target data would cause a subsequent explanation that does not relate to the features upon which the first and second explanations rely. In this aspect, such a region may be referred to a brittle explanation region, because the introduction of additional data is likely to have an unacceptably major impact upon the corresponding explanation, and therefore, the fact that this region is brittle indicates that the region is susceptible to explanation poisoning that may be intentionally caused by a malicious actor.

At step S420, when additional data is actually introduced into the brittle explanation region of the N-dimensional space, the model manipulation via explanation poisoning module 302 generates an alert in order to notify a user that there is a high likelihood that the model may be adversely manipulated as a result of the additional data. In this manner, a user may be able to protect the model from the dangerous possibility of explanation poisoning by taking further action to counteract the introduction of the additional data from the brittle explanation region. In addition, a user may be able to further protect the model by generating and introducing synthetic data that is designed to strengthen the ability of the model to withstand the potential subsequent introduction of data into the brittle explanation region.

Accordingly, with this technology, an optimized process for detecting attempted manipulation of a machine learning model through explanation poisoning in order to maintain quality and accuracy of model outputs is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for detecting attempted manipulation of a machine learning model via explanation poisoning, the method being implemented by at least one processor, the method comprising:
    receiving, by the at least one processor, a set of raw data that is usable for training a first model;
    training, by the at least one processor, the first model by using the set of raw data;
    selecting, by the at least one processor, a set of target data based on the set of raw data;
    computing, by the at least one processor, a first explanation based on an output of the first model with respect to a first data point included in the set of target data, the first explanation including first information that relates to at least one first feature that affects the output of the first model with respect to the first data point;
    computing, by the at least one processor, a second explanation based on an output of the first model with respect to a second data point included in the set of target data, the second explanation including second information that relates to at least one second feature that affects the output of the first model with respect to the second data point;
    assigning, by the at least one processor based on the at least one first feature, a first label to the first explanation, and assigning, by the at least one processor based on the at least one second feature, a second label to the second explanation;
    generating, by the at least one processor based on the first label and the second label, an explanation ensemble that resides in an N-dimensional space, N being equal to a number of assigned labels plus one;
    transforming, by the at least one processor, the set of raw data into data that resides in the N-dimensional space;
    determining, by the at least one processor based on the transformed set of raw data, a region within the N-dimensional space for which a subsequent introduction of additional data from the target set of data causes a subsequent explanation that does not relate to at least one from among the at least one first feature and the at least one second feature; and
    when the additional data is introduced to the determined region, generating, by the at least one processor, an alert message that includes information for notifying a user that a likelihood of adverse manipulation of the first model is high based on the additional data.

2. The method of claim 1, wherein the first model includes at least one from among a tree-based model, a neural network model, and a linear model.

3. The method of claim 1, wherein the at least one first feature comprises a plurality of first features that relate to the first model, and wherein the first information further includes a corresponding ranking value for each respective feature from among the plurality of first features.

4. The method of claim 3, wherein the computing of the first explanation comprises applying a Shapley Additive explanations (SHAP) technique to each feature from among the plurality of first features.

5. The method of claim 1, wherein the at least one second feature comprises a plurality of second features that relate to the first model, and wherein the second information further includes a corresponding ranking value for each respective feature from among the plurality of second features.

6. The method of claim 5, wherein the computing of the second explanation comprises applying a Shapley Additive explanations (SHAP) technique to each feature from among the plurality of second features.

7. The method of claim 1, further comprising:
    computing, by the at least one processor, at least a third explanation based on an output of the first model with respect to at least a third data point included in the set of target data, the at least third explanation including third information that relates to at least one third feature that affects the output of the first model with respect to the at least third data point; and
    assigning, by the at least one processor based on the at least one third feature, at least a third label to the at least third explanation,
    wherein the generating of the explanation ensemble is further based on the at least third label; and
    wherein the determining of the region further comprises determining the region for which the subsequent introduction of the additional data causes a subsequent explanation that does not relate to at least one from among the at least one first feature, the at least one second feature, and the at least one third feature.

8. The method of claim 1, wherein the set of raw data comprises bond pricing data that relates to a first bond, and wherein the first model is configured to generate a projected price of the first bond at a particular time.

9. The method of claim 1, wherein the set of raw data comprises credit scoring data that relates to a credit request associated with an individual credit applicant, and wherein the first model is configured to determine whether to approve the credit request.

10. A computing apparatus for detecting attempted manipulation of a machine learning model via explanation poisoning, the computing apparatus comprising:
a processor;
a memory; and
a communication interface coupled to each of the processor and the memory,
wherein the processor is configured to:
receive, via the communication interface, a set of raw data that is usable for training a first model;
train the first model by using the set of raw data;
select a set of target data based on the set of raw data;
compute a first explanation based on an output of the first model with respect to a first data point included in the set of target data, the first explanation including first information that relates to at least one first feature that affects the output of the first model with respect to the first data point;
compute a second explanation based on an output of the first model with respect to a second data point included in the set of target data, the second explanation including second information that relates to at least one second feature that affects the output of the first model with respect to the second data point;
assign, based on the at least one first feature, a first label to the first explanation, and assign, based on the at least one second feature, a second label to the second explanation;
generate, based on the first label and the second label, an explanation ensemble that resides in an N-dimensional space, N being equal to a number of assigned labels plus one;
transform the set of raw data into data that resides in the N-dimensional space;
determine, based on the transformed set of raw data, a region within the N-dimensional space for which a subsequent introduction of additional data from the target set of data causes a subsequent explanation that does not relate to at least one from among the at least one first feature and the at least one second feature; and
when the additional data is introduced to the determined region, generate an alert message that includes information for notifying a user that a likelihood of adverse manipulation of the first model is high based on the additional data.

11. The computing apparatus of claim 10, wherein the first model includes at least one from among a tree-based model, a neural network model, and a linear model.

12. The computing apparatus of claim 10, wherein the at least one first feature comprises a plurality of first features that relate to the first model, and wherein the first information further includes a corresponding ranking value for each respective feature from among the plurality of first features.

13. The computing apparatus of claim 12, wherein the processor is configured to compute the first explanation by applying a Shapley Additive explanations (SHAP) technique to each feature from among the plurality of first features.

14. The computing apparatus of claim 10, wherein the at least one second feature comprises a plurality of second features that relate to the first model, and wherein the second information further includes a corresponding ranking value for each respective feature from among the plurality of second features.

15. The computing apparatus of claim 14, wherein the processor is configured to compute the second explanation by applying a Shapley Additive explanations (SHAP) technique to each feature from among the plurality of second features.

16. The computing apparatus of claim 10, wherein the processor is further configured to:
compute at least a third explanation based on an output of the first model with respect to at least a third data point included in the set of target data, the at least third explanation including third information that relates to at least one third feature that affects the output of the first model with respect to the at least third data point; and
assign, based on the at least one third feature, at least a third label to the at least third explanation,
wherein the explanation ensemble is further based on the at least third label; and
wherein the processor is further configured to determine the region by determining the region for which the subsequent introduction of the additional data causes a subsequent explanation that does not relate to at least one from among the at least one first feature, the at least one second feature, and the at least one third feature.

17. The computing apparatus of claim 10, wherein the set of raw data comprises bond pricing data that relates to a first bond, and wherein the first model is configured to generate a projected price of the first bond at a particular time.

18. The computing apparatus of claim 10, wherein the set of raw data comprises credit scoring data that relates to a credit request associated with an individual credit applicant, and wherein the first model is configured to determine whether to approve the credit request.

19. A non-transitory computer readable storage medium storing instructions for detecting attempted manipulation of a machine learning model via explanation poisoning, the storage medium comprising executable code which, when executed by a processor, causes the processor to:
receive a set of raw data that is usable for training a first model;
train the first model by using the set of raw data;
select a set of target data based on the set of raw data;
compute a first explanation based on an output of the first model with respect to a first data point included in the set of target data, the first explanation including first information that relates to at least one first feature that affects the output of the first model with respect to the first data point;
compute a second explanation based on an output of the first model with respect to a second data point included in the set of target data, the second explanation including second information that relates to at least one second feature that affects the output of the first model with respect to the second data point;
assign, based on the at least one first feature, a first label to the first explanation, and assign, based on the at least one second feature, a second label to the second explanation;

generate, based on the first label and the second label, an explanation ensemble that resides in an N-dimensional space, N being equal to a number of assigned labels plus one;
transform the set of raw data into data that resides in the N-dimensional space;
determine, based on the transformed set of raw data, a region within the N-dimensional space for which a subsequent introduction of additional data from the target set of data causes a subsequent explanation that does not relate to at least one from among the at least one first feature and the at least one second feature; and
when the additional data is introduced to the determined region, generate an alert message that includes information for notifying a user that a likelihood of adverse manipulation of the first model is high based on the additional data.

20. The storage medium of claim 19, wherein the first model includes at least one from among a tree-based model, a neural network model, and a linear model.

* * * * *